(12) United States Patent
Oechsle et al.

(10) Patent No.: US 11,473,708 B2
(45) Date of Patent: Oct. 18, 2022

(54) RELEASABLE PLUG CONNECTION

(71) Applicant: Neoperl GmbH, Mullheim (DE)

(72) Inventors: Daniel Oechsle, Mullheim (DE); Holger Reinhardt, March/Buchheim (DE)

(73) Assignee: NEOPERL GMBH, Mullheim (DE)

( * ) Notice: Subject to any disclaimer, the term of this patent is extended or adjusted under 35 U.S.C. 154(b) by 175 days.

(21) Appl. No.: 16/961,141

(22) PCT Filed: Nov. 20, 2018

(86) PCT No.: PCT/EP2018/081935
§ 371 (c)(1),
(2) Date: Jul. 9, 2020

(87) PCT Pub. No.: WO2019/166116
PCT Pub. Date: Sep. 6, 2019

(65) Prior Publication Data
US 2020/0386355 A1    Dec. 10, 2020

(30) Foreign Application Priority Data

Feb. 28, 2018   (DE) .......................... 202018101116.2

(51) Int. Cl.
*F16L 37/098*    (2006.01)

(52) U.S. Cl.
CPC ....... *F16L 37/0985* (2013.01); *F16L 2201/10* (2013.01)

(58) Field of Classification Search
CPC . F16L 37/0982; F16L 37/0985; F16L 37/133; F16L 37/138
(Continued)

(56) References Cited

U.S. PATENT DOCUMENTS

| 4,681,351 A | 7/1987 | Bartholomew |
| 5,374,088 A | 12/1994 | Moretti et al. |

(Continued)

FOREIGN PATENT DOCUMENTS

| CN | 104364572 | 2/2015 |
| DE | 102007032324 | 1/2009 |

(Continued)

*Primary Examiner* — Aaron M Dunwoody
(74) *Attorney, Agent, or Firm* — Volpe Koenig

(57) ABSTRACT

A releasable plug connection with a tubular plug-in part, and with a sleeve-shaped receiving part which has an insertion opening through which the plug-in part is insertable into a sleeve interior of the receiving part. At least one annular groove is provided on the inner circumference of the receiving part, in which an annular seal is arranged which provides sealing in the annular gap between the inner circumference of the receiving part and the outer circumference of the plug-in part. The insertion opening opens out in a first interior portion of the sleeve interior that is configured as a cross-sectional widening in relation to an adjacent second interior portion and is delimited by an annular shoulder, and an insertion sleeve is insertable in the first interior portion of the sleeve interior, its peripheral edge directed towards the annular shoulder being spaced apart from the annular shoulder to form the annular groove between the peripheral edge of the insertion sleeve and the annular shoulder.

7 Claims, 2 Drawing Sheets

(58) Field of Classification Search
USPC .................................................. 285/305, 319
See application file for complete search history.

(56) References Cited

U.S. PATENT DOCUMENTS

| | | | |
|---|---|---|---|
| 5,466,017 | A | 11/1995 | Szabo et al. |
| 6,293,596 | B1 | 9/2001 | Kinder |
| 2003/0025326 | A1 | 2/2003 | Cie |
| 2005/0161940 | A1 | 7/2005 | Malone |
| 2007/0120362 | A1* | 5/2007 | Poder .................. F16L 37/0985 285/314 |
| 2009/0230673 | A1 | 9/2009 | Freter |
| 2010/0148491 | A1 | 6/2010 | Takenaka et al. |
| 2011/0018254 | A1 | 1/2011 | Kuck et al. |
| 2014/0319820 | A1 | 10/2014 | Takimoto et al. |
| 2015/0021902 | A1 | 1/2015 | Kury |

FOREIGN PATENT DOCUMENTS

| | | |
|---|---|---|
| DE | 102008014255 | 1/2009 |
| DE | 102008013565 | 9/2009 |
| DE | 202012000597 | 4/2013 |
| EP | 1559945 | 8/2005 |
| FR | 2919373 | 1/2009 |

* cited by examiner

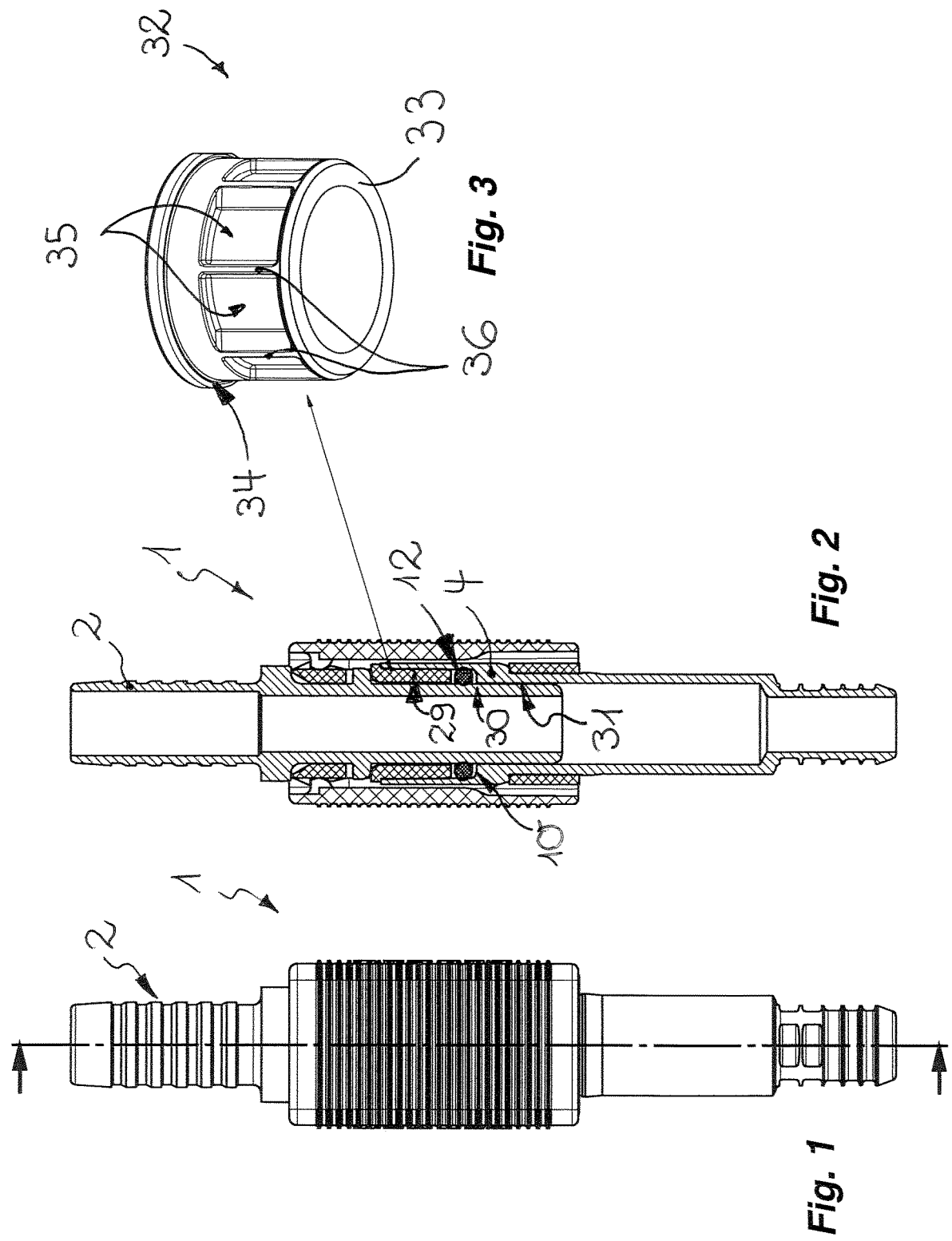

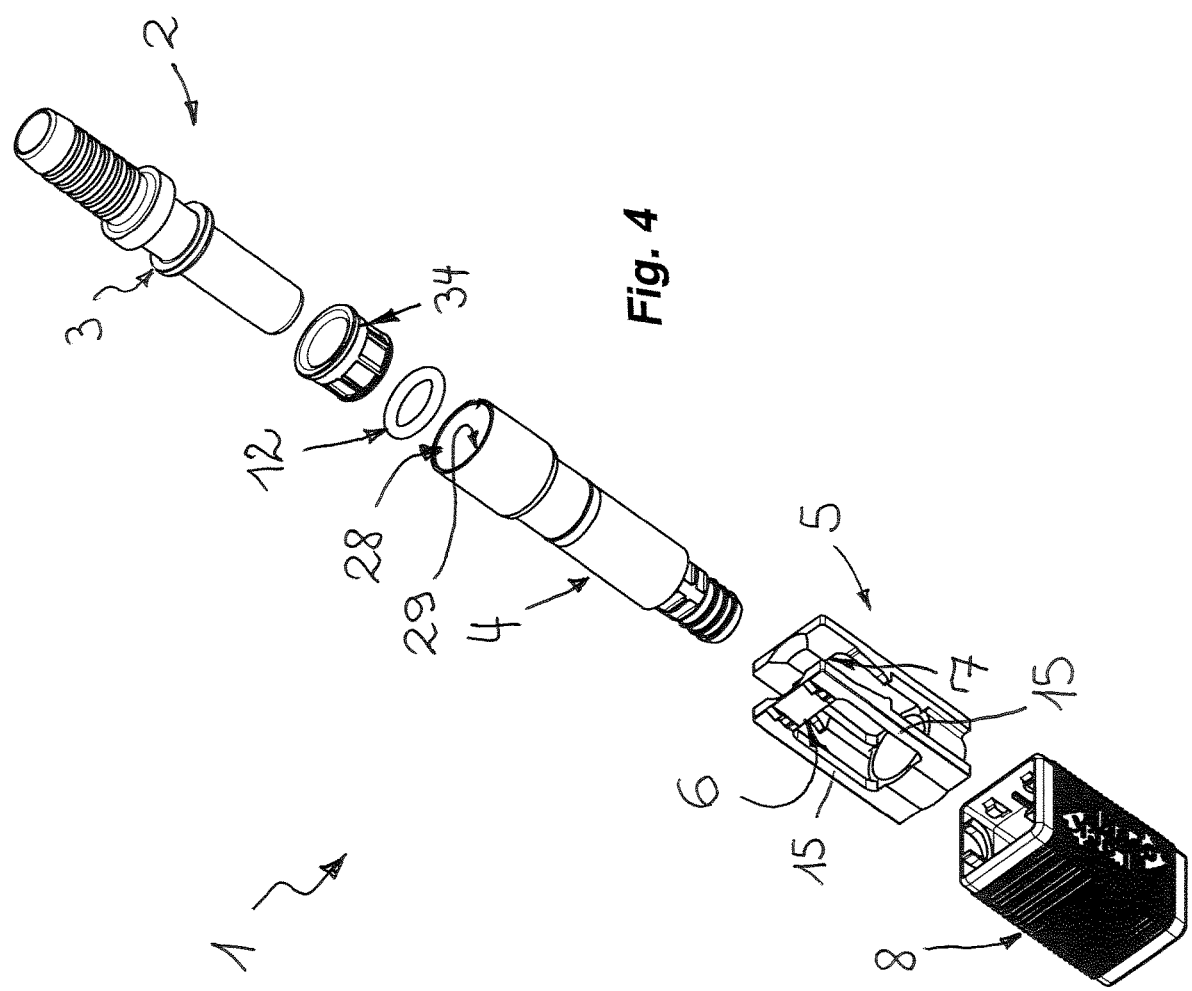

RELEASABLE PLUG CONNECTION

TECHNICAL FIELD

The invention relates to a releasable plug connection comprising a tubular plug-in part and a sleeve-shaped receiving part which has an insertion opening, through which insertion opening the plug-in part can be inserted into a sleeve interior of the receiving part, wherein at least one annular groove is provided on the inner circumference of the receiving part, in which annular groove an annular seal which provides sealing in the annular gap between the inner circumference of the receiving part and the outer circumference of the plug-in part is arranged.

BACKGROUND

DE 20 2012 000 597 U1 has already disclosed a releasable plug connection of the kind mentioned at the outset. The previously disclosed plug connection, which is configured as a releasable hose connection, has a tubular plug-in part which carries at least one holding projection on its outer circumference and which has a sleeve-shaped receiving part, the interior of which is intended for insertion of the tubular plug-in part. The receiving part has connected to it a connecting element on which at least one holding edge, which is directed inward and engages behind the holding projection after the plug-in part is pressed in, is held such that it can be bent upward or pivoted upward. The previously disclosed plug connection has a sleeve-shaped securing element which engages in a displaceable manner around the connecting element in such a way that the securing element can be moved between a release position, in which release position the axial sliding movement of the securing element can be converted into an opening movement, which is oriented transversely thereto, of the holding edge, and a securing position, in which securing position the securing element engages around the connecting element in such a way that bending upward of the connecting element is prevented in the region of the holding edges. In an intermediate or coupling position of the securing element, the connecting element projects beyond the securing element at least in regions in such a way that the holding edges can be bent upward when the holding projection, which is provided on the plug-in part, is pressed in. In the previously disclosed plug connection, the plug-in part and the receiving part are produced from metal by machining. In order to seal the annular gap between the inner circumference of the receiving part on the one hand and the outer circumference of the plug-in part on the other, at least one annular groove is provided on the inner circumference of the receiving part, in which annular groove an annular seal is arranged. This annular groove in the interior of the sleeve-shaped receiving part is also produced by machining. In this case, the metal chips which adhere in the housing interior of the sleeve-shaped receiving part after the production process are difficult to remove in order to finish the previously disclosed plug connection and its receiving part. However, metal chips can further settle in the groove base of the annular groove which is provided in the housing interior of the receiving part, which metal chips then have an adverse effect on proper sealing of the annular gap, which is provided between the receiving part and the plug-in part, by means of the annular seal. The impairment of the annular seal in the region of the annular gap which is provided between the receiving part and the insertion part can lead to undesired and severe leaks in the hose line in the region of its plug connection.

SUMMARY

The object is therefore to provide a releasable plug connection of the kind mentioned at the outset in which malfunctions and undesired leaks after production and assembly of the plug connection and its constituent parts can be largely avoided.

In the case of the plug connection of the kind mentioned at the outset, this object is achieved according to the invention in particular in that the insertion opening of the receiving part opens out in a first interior section of the sleeve interior, which interior section is designed as a cross-sectional widened portion in relation to an adjacent second interior section and is delimited by an annular shoulder, and in that an insertion sleeve can be inserted into the first interior section of the sleeve interior, the end circumferential border, which faces the annular shoulder, of said insertion sleeve being at such a distance from the annular shoulder that the annular groove is formed between the end circumferential border of the insertion sleeve and the annular shoulder.

The plug connection according to the invention has a tubular plug-in part and a sleeve-shaped receiving part which can be releasably connected to one another. The receiving part has an insertion opening, through which insertion opening the plug-in part can be inserted into a sleeve interior of the receiving part. At least one annular groove is provided on the inner circumference of the receiving part, in which annular groove an annular seal which provides sealing in the annular gap between the inner circumference of the receiving part on the one hand and the outer circumference of the plug-in part on the other is arranged. In the plug connection according to the invention, this annular groove is not finished by machining. Rather, according to the invention, provision is made for the insertion opening of the receiving part to open out in a first interior section of the sleeve interior, which interior section is designed as a cross-sectional widened portion in relation to an adjacent second interior section and is delimited by an annular shoulder. An insertion sleeve can be inserted into this first interior section of the sleeve interior, the end circumferential border, which faces the annular shoulder, of said insertion sleeve being at such a distance from the annular shoulder that the annular groove, which is provided for the annular seal, is formed between the end circumferential border of the insertion sleeve on the one hand and the annular shoulder on the inner circumference of the receiving part on the other. Since complicated cleaning of the receiving part can be dispensed with in the case of the plug connection according to the invention, the plug connection according to the invention and its receiving part can be produced in a simple manner. In the process, the annular groove, which is required for the annular seal, between the annular shoulder, which is provided on the inner circumference of the receiving part, on the one hand and the adjacent end border of the insertion sleeve, which is pushed into the receiving part, on the other is formed.

In order to further additionally facilitate assembly of the plug connection according to the invention, it is advantageous when the insertion sleeve can be inserted into the first interior section until an annular shoulder or annular flange, which is provided on the sleeve outer circumference of the insertion sleeve, bears against an end border, which surrounds the insertion opening, of the receiving part. The insertion sleeve therefore has an annular shoulder or annular flange which limits the insertion movement of the insertion sleeve through the insertion opening on the receiving part into the sleeve interior of the receiving part.

A particularly advantageous embodiment according to the invention makes provision for the insertion sleeve to be held in a frictional and/or interlocking manner in the first interior section of the receiving part. Due to the frictional and/or interlocking connection between the insertion sleeve on the one hand and the receiving part on the other, the distance between the annular shoulder, which is provided on the inner circumference of the receiving part, and the adjacent end border of the insertion sleeve is ensured.

In order that an annular groove which has groove walls which are arranged transversely and preferably at a right angle to the longitudinal axis of the receiving part can be formed on the inner circumference of the receiving part, it is advantageous when the annular shoulder and the end circumferential border, which faces the annular shoulder, of the insertion sleeve lie in planes which are arranged transversely and preferably at a right angle to the longitudinal axis of the sleeve interior of the receiving part.

The frictional connection between the insertion sleeve on the one hand and the inner circumference of the receiving part on the other should be dimensioned such that the insertion sleeve can be easily pushed through the insertion opening of the receiving part into its sleeve interior and that the insertion sleeve is nevertheless held fixedly and securely in the sleeve interior of the receiving part after the insertion. The insertion sleeve can have a cylindrical sleeve outer circumference but, in order to be able to sufficiently fixedly dimension this frictional connection, it may be advantageous when the insertion sleeve has at least one recess on the outer circumference. Excessive frictional connection between the insertion sleeve on the one hand and the receiving part on the other is avoided owing to this recess.

In this case, a preferred development according to the invention makes provision for the insertion sleeve to have at least two recesses, which are separated from one another by longitudinal ribs, on the outer circumference. These longitudinal ribs can firstly ensure the frictional connection between the insertion sleeve and the receiving part—but at the same time these longitudinal ribs also further additionally reinforce the insertion sleeve in the region of the recesses.

The advantages of an insertion sleeve which is provided with recesses are further fostered when the longitudinal ribs bear against the inner circumference of the receiving part in a frictional manner.

In order to avoid undesired leakage flows, it is advantageous when the insertion sleeve bears against the inner circumference of the receiving part by way of sleeve circumferential subregions which are arranged on either side of the at least one recess in the sleeve longitudinal direction.

A preferred exemplary embodiment of the plug connection according to the invention, which exemplary embodiment is distinguished by a secure and fixed connection in the region of the plug coupling, makes provision for the plug-in part to carry at least one holding projection on its outer circumference and for the receiving part to have connected to it a connecting element on which at least one holding edge, which is directed inward and engages behind the holding projection after the plug-in part is pressed in, is held such that it can be bent upward or pivoted upward, wherein a sleeve-shaped securing element is provided, which securing element engages in a displaceable manner around the connecting element in such a way that the securing element can be moved between a release position, in which release position the axial sliding movement of the securing element can be converted into an opening movement, which is oriented transversely thereto, of the holding edge, and a securing position, in which securing position the securing element engages around the connecting element in such a way that bending upward of the connecting element in the region of the holding edges is prevented, and wherein the connecting element projects beyond the securing element in an intermediate or coupling position of the securing element at least in regions in such a way that the holding edges can be bent upward when the holding projection, which is provided on the plug-in part, is pressed in.

BRIEF DESCRIPTION OF THE DRAWINGS

Developments according to the invention can be found in the following description of the figures in conjunction with the claims and the drawing. The invention is described in more detail below with reference to a preferred embodiment.

In the drawings:

FIG. 1 shows a side view of a plug connection which is configured as a releasable hose connection and has a sleeve-shaped receiving part, into the sleeve interior of which a tubular plug-in part is inserted, FIG. 2 shows a cut-open longitudinal section of the plug connection from FIG. 1 through section plane II-II according to FIG. 1, FIG. 3 shows a perspective side view of an insertion sleeve which can be pushed into the sleeve interior of the sleeve-shaped receiving part in such a way that an annular groove which is intended for receiving an annular seal is formed on the inner circumference of the receiving part, and FIG. 4 shows the plug connection from FIGS. 1 to 3 with an exploded illustration of its constituent parts.

DETAILED DESCRIPTION

FIGS. 1 to 4 show a releasable plug connection 1 and the essential constituent parts thereof. The plug connection 1 has a tubular plug-in part 2 which carries at least one holding projection 3 on the outer circumference. The plug-in part 2 can be inserted into the sleeve interior of a sleeve-shaped receiving part 4. The receiving part 4 is connected to a connecting element 5 which has to establish the releasable connection between the receiving part 4 and the plug-in part 2 after the plug-in part 2 is pressed into the sleeve interior. After the plug-in part 2 is pressed into the receiving part 4, holding edges 6, 7, which are directed inward and are held such that they can be bent upward or pivoted upward on the connecting element 5, engage behind the holding projection 3 which is provided on the plug-in part 2.

The plug connection 1 has a sleeve-shaped securing element 8 which engages in a displaceable manner around the connecting element 5 in such a way that the securing element 8 can be moved between a release position and a securing position shown in FIGS. 1 and 2. Whereas in the release position the axial sliding movement of the securing element 8 can be converted into an upward bending or upward pivoting movement, which is oriented transversely thereto, of the holding edges 6, 7, which movement disengages the holding edges 6, 7 from the holding projection 3 on the plug-in part 2, in the securing position the securing element 8 engages around the connecting element 5 in a bending or pivoting region in such a way that upward bending of the connecting element 5 in the region of the holding edges 6, 7 is securely prevented and the holding edges 6, 7 fixedly engage behind the holding projection 3, even under a high load. Even with uncontrolled application of force on the securing element 8 in the radial direction, the securing element 8 is able to secure the fixed connection, which can be subjected to high loading in the axial direction, of the plug-in part 2 and the receiving part 4.

In a central or coupling position, not shown further here, in which the connection is already operationally reliable and withstands the loads which are usual during operation and which is provided between the securing position and the release position on the axial sliding path of the securing element 8, the connecting element 5 projects beyond the securing element 8 at least in regions in such a way that the holding edges 6, 7 can be bent upward when the holding projection 3, which is provided on the plug-in part 2, is pressed in and can engage behind the holding projection 3 on the plug-in part 2. The subregions, which project beyond the securing element 8 and can be colored in an indicting color, of the connecting element 5 indicate here that the plug connection 1 is not yet in its securing position. In this case, the area center of gravity of the contact area of the holding projection 3 on the one hand and the holding edges 6, 7 on the other is selected such that no externally acting bending forces are created in the connecting element 5 and, in particular, in its connecting arms 15. Since the plug connection 1 according to the invention consists of few constituent parts which can be manufactured with a low level of expenditure, it can be produced in a comparatively cost-effective manner.

It is clear in FIGS. 1 and 2 that the plug connection 1 is designed as a releasable hose connection and that, to this end, both the receiving part 4 and also the plug-in part 3 are connected to a hose section of a flexible hose line. The hose sections of the hose line can be reinforced by an outer metal mesh.

The longitudinal section according to FIG. 2 shows that an annular groove 10 is provided on the inner circumference of the receiving part 4, in which annular groove an annular seal 12 which seals off the annular gap between the inner circumference of the receiving part 4 on the one hand and the plug-in part 2, which is inserted therein, on the other in a liquid-tight manner is arranged. In order to form this annular groove 10, the receiving part 4 has an insertion opening 28 which opens out in a first interior section 29 of the sleeve interior of the receiving part. This first interior section is formed as a cross-sectional widened portion in relation to an adjacent second interior section 31 and is delimited by an annular shoulder 30. In this case, an insertion sleeve 32 can be inserted into the first interior section 29 of the sleeve interior, the end circumferential border 33, which faces the annular shoulder 30, of said insertion sleeve being at such a distance from the annular shoulder 30 that the annular groove 10 is formed between the end circumferential border 33 of the insertion sleeve 32 on the one hand and the annular shoulder 30 on the other. Whereas the receiving part 2 and the plug-in part can also be produced from metal, the insertion sleeve 32 is preferably produced as plastic, and in particular as a plastic injection-molded part.

The insertion sleeve 32 can be inserted into the sleeve interior of the receiving part 4 until an annular projection or annular flange 34, which is provided on the sleeve outer circumference of the insertion sleeve 32, bears against an end border, which surrounds the insertion opening 28, of the receiving part 4.

In this case, the insertion sleeve 32 is held preferably in a frictional and possibly also interlocking manner in the first interior section of the receiving part 4.

In order to be able to configure the annular groove 10, which is provided for receiving the annular seal 12, in a sufficiently deep manner and in order to securely hold the annular seal 12 in the annular groove 10, the annular shoulder 30 and the end circumferential border 33, which faces the annular shoulder 30, of the insertion sleeve 32 are provided in parallel planes which are arranged at a right angle to the longitudinal axis of the sleeve interior of the receiving part 4.

The perspective side view of the insertion sleeve shown in FIG. 3 shows that said insertion sleeve has at least one recess 35 on the outer circumference. The insertion sleeve 32 has a plurality of recesses 35 which are arranged in a manner distributed at equal distances over the circumference of the insertion sleeve 32 and which are respectively separated from one another by longitudinal ribs 36. In this case, it is advantageous when the longitudinal ribs 36 also bear in a frictional manner against the inner circumference of the receiving part 4. A leak in the hose line is also avoided in the region of the plug coupling 1 when the insertion sleeve 32 bears against the inner circumference of the receiving part 4 by way of its sleeve circumferential subregions which are arranged on either side of the at least one recess 35 in the sleeve longitudinal direction.

LIST OF REFERENCE SIGNS

1 Plug connection
2 Plug-in part
3 Holding projection (on the plug-in part 2)
4 Receiving part
5 Connecting element
6 Holding edge
7 Holding edge
8 Securing element
10 Annular groove
12 Annular seal
15 Connecting arms
28 Insertion opening
29 First interior section
30 Annular shoulder
31 Second interior section
32 Insertion sleeve
33 End circumferential border
34 Annular flange
35 Recess
36 Longitudinal ribs

The invention claimed is:
1. A releasable plug connection (1) comprising:
a tubular plug-in part (2);
a sleeve-shaped receiving part (4) which has an insertion opening (28), through which insertion opening (28) the plug-in part (2) is insertable into a sleeve interior of the receiving part (4);
an annular groove (10) provided on an inner circumference of the receiving part (4);
an annular seal (12) which provides sealing in an annular gap between the inner circumference of the receiving part (4) and an outer circumference of the plug-in part (2) arranged in the annular groove;
the insertion opening (28) of the receiving part (4) opens out in a first interior section (29) of the sleeve interior, said first interior section (29) comprises a cross-sectional widened portion in relation to an adjacent second interior section (31) and is delimited by an annular shoulder (30); and an insertion sleeve (32) is inserted into the first interior section (29) of the sleeve interior, an end circumferential border (33), which faces the annular shoulder (30), of said insertion sleeve being spaced apart a distance from the annular shoulder (30) to form the annular groove (10) between the end circumferential border (33) of the insertion sleeve (32) and the annular shoulder (30), wherein the insertion sleeve (32) has at least two recesses (35), which are separated from one another by longitudinal ribs (36), on the outer circumference.

2. The plug connection as claimed in claim 1, wherein the insertion sleeve (32) is inserted into the first interior section (29) until an annular shoulder or annular flange (34), which is provided on a sleeve outer circumference of the insertion sleeve (32), bears against an end border, which surrounds the insertion opening (28), of the receiving part (4).

3. The plug connection as claimed in claim 1, wherein the insertion sleeve (32) is held in at least one of a frictional or interlocking manner in the first interior section (29) of the receiving part (4).

4. The plug connection as claimed in claim 1, wherein the annular shoulder (30) and the end circumferential border (33), which faces the annular shoulder (30), of the insertion sleeve (32) lie in planes which are arranged transversely to a longitudinal axis of the sleeve interior of the receiving part (4).

5. The plug connection as claimed in claim 1, wherein the longitudinal ribs (36) bear against the inner circumference of the receiving part (4) in a frictional manner.

6. The plug connection as claimed in claim 1, wherein the insertion sleeve (32) bears against the inner circumference of the receiving part (4) by way of sleeve circumferential subregions which are arranged on either side of the at least one recess (35) in a longitudinal direction of the sleeve.

7. A releasable plug connection (1) comprising:
a tubular plug-in part (2);
a sleeve-shaped receiving part (4) which has an insertion opening (28), through which insertion opening (28) the plug-in part (2) is insertable into a sleeve interior of the receiving part (4);
an annular groove (10) provided on an inner circumference of the receiving part (4);
an annular seal (12) which provides sealing in an annular gap between the inner circumference of the receiving part (4) and an outer circumference of the plug-in part (2) arranged in the annular groove;
the insertion opening (28) of the receiving part (4) opens out in a first interior section (29) of the sleeve interior, said first interior section (29) comprises a cross-sectional widened portion in relation to an adjacent second interior section (31) and is delimited by an annular shoulder (30); and
an insertion sleeve (32) is inserted into the first interior section (29) of the sleeve interior, an end circumferential border (33), which faces the annular shoulder (30), of said insertion sleeve being spaced apart a distance from the annular shoulder (30) to form the annular groove (10) between the end circumferential border (33) of the insertion sleeve (32) and the annular shoulder (30), wherein the plug-in part (2) includes at least one holding projection (3) on the outer circumference thereof, and the receiving part (4) has a connecting element (5) connected thereto on which at least one holding edge (6, 7), which is directed inward and engages behind the holding projection (3) after the plug-in part (2) is pressed in, is held such that the holding edge (6, 7) can be bent upward or pivoted upward, a sleeve-shaped securing element (8) is provided, said securing element (8) engages in a displaceable manner around the connecting element (5) such that the securing element (8) is moveable between a release position, in which the axial sliding movement of the securing element (8) is convertible into an opening movement, which is oriented transversely thereto, of the holding edge (6, 7), and a securing position, in which the securing element (8) engages around the connecting element (5) in such a way that bending upward of the connecting element (5) in the region of the holding edges (6, 7) is prevented, and the connecting element (5) projects beyond the securing element (8) in an intermediate or coupling position of the securing element (8) at least in regions such that the holding edges (6, 7) is bendable upward when the holding projection (3), which is provided on the plug-in part (2), is pressed in.

\* \* \* \* \*